United States Patent
Hagen

(10) Patent No.: US 10,451,191 B2
(45) Date of Patent: Oct. 22, 2019

(54) SOLENOID VALVE DEVICE FOR A MOTOR VEHICLE

(71) Applicant: AUDI AG, Ingolstadt (DE)

(72) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 69 days.

(21) Appl. No.: 15/146,365

(22) Filed: May 4, 2016

(65) Prior Publication Data

US 2016/0327174 A1 Nov. 10, 2016

(30) Foreign Application Priority Data

May 5, 2015 (DE) .................. 10 2015 005 754

(51) Int. Cl.
| | |
|---|---|
| *B60K 15/035* | (2006.01) |
| *F16K 27/12* | (2006.01) |
| *F16K 31/06* | (2006.01) |
| *B60K 15/03* | (2006.01) |

(52) U.S. Cl.
CPC ........ *F16K 27/12* (2013.01); *B60K 15/03519* (2013.01); *F16K 31/0644* (2013.01); *B60K 15/03* (2013.01); *B60K 2015/03302* (2013.01); *Y10T 137/6881* (2015.04)

(58) Field of Classification Search
CPC .............. B60K 15/03; B60K 15/03519; B60K 2015/03302; F16K 27/12; F16K 31/0644; Y10T 137/6851; Y10T 137/6881; Y10T 137/6855
USPC ........................................ 137/343, 351, 899
See application file for complete search history.

(56) References Cited

U.S. PATENT DOCUMENTS

| | | | | |
|---|---|---|---|---|
| 4,299,544 A | * | 11/1981 | Masaka ................. | F04B 17/046 417/417 |
| 4,842,010 A | * | 6/1989 | Edgecomb .......... | F16H 61/0009 137/343 |
| 6,085,615 A | * | 7/2000 | Kirkendall .......... | F16H 61/0009 74/606 R |
| 6,095,188 A | | 8/2000 | Anderson et al. | |

(Continued)

FOREIGN PATENT DOCUMENTS

| | | |
|---|---|---|
| DE | 35 36 352 A1 | 4/1986 |
| DE | 10 2004 059 119 A1 | 2/2006 |

(Continued)

OTHER PUBLICATIONS

European Search Report dated Oct. 11, 2016 with respect to counterpart Chinese patent application EP 16 00 0965.

(Continued)

*Primary Examiner* — Robert K Arundale
*Assistant Examiner* — Jonathan J Waddy
(74) *Attorney, Agent, or Firm* — Henry G. Feiereisen LLC

(57) ABSTRACT

A solenoid valve device for a motor vehicle includes a solenoid valve having an electromagnet, and a fastening device configured to fasten the solenoid valve to a motor vehicle body of the motor vehicle. The fastening device has a carrier element for attachment of the solenoid valve, and holding arms extending from the carrier element for mounting the carrier element to the motor vehicle body. The holding arms support the solenoid valve, at least in part, between them and are made elastic in a pulling direction of the electromagnet of the solenoid valve.

15 Claims, 2 Drawing Sheets

(56) References Cited

U.S. PATENT DOCUMENTS

| | | | |
|---|---|---|---|
| 6,170,516 B1* | 1/2001 | Sakata | F02M 25/0836 137/343 |
| 6,230,585 B1* | 5/2001 | Bator | F16H 61/0009 137/343 |
| 6,450,152 B1 | 9/2002 | Everingham | |
| 8,607,765 B2 | 12/2013 | Hagen | |
| 8,931,523 B2 | 1/2015 | Hagen et al. | |
| 8,955,496 B2 | 2/2015 | Hagen | |
| 8,967,193 B2 | 3/2015 | Hagen | |
| 9,163,591 B2 | 10/2015 | Hagen | |
| 2002/0030358 A1* | 3/2002 | Palvoelgyi | B60K 15/03 280/834 |
| 2003/0034070 A1* | 2/2003 | Moreno | F16K 27/003 137/454.2 |
| 2005/0215703 A1* | 9/2005 | Mukasa | C08K 3/0033 524/601 |
| 2006/0033322 A1* | 2/2006 | Suess | B60K 15/03006 280/830 |
| 2006/0278838 A1 | 12/2006 | Chavanne | |
| 2009/0019683 A1* | 1/2009 | Jannot | B60K 15/03 29/428 |
| 2011/0162726 A1* | 7/2011 | Ito | F02M 25/0836 137/382 |
| 2012/0055943 A1 | 3/2012 | Muller-Riederer | |
| 2012/0111307 A1 | 5/2012 | Hagen | |
| 2012/0152489 A1 | 6/2012 | Hagen | |
| 2012/0160218 A1 | 6/2012 | Hagen | |
| 2012/0160220 A1 | 6/2012 | Hagen | |
| 2012/0168454 A1 | 7/2012 | Hagen | |
| 2012/0174894 A1 | 7/2012 | Hagen | |
| 2012/0175379 A1 | 7/2012 | Hagen | |
| 2012/0179354 A1 | 7/2012 | Hagen | |
| 2012/0186670 A1 | 7/2012 | Hagen | |
| 2012/0234074 A1 | 9/2012 | Hagen | |
| 2014/0117023 A1* | 5/2014 | Ehler | B60K 15/067 220/562 |
| 2014/0137948 A1 | 5/2014 | Hagen | |
| 2014/0216420 A1 | 8/2014 | Hagen | |

FOREIGN PATENT DOCUMENTS

| | | |
|---|---|---|
| DE | 10 2009 041 853 A1 | 3/2011 |
| DE | 10 2010 044 336 | 3/2012 |
| DE | 10 2012 215 516 A1 | 3/2014 |

OTHER PUBLICATIONS

Translation of European Search Report dated Oct. 11, 2016 with respect to counterpart Chinese patent application EP 16 00 0965.

* cited by examiner

SOLENOID VALVE DEVICE FOR A MOTOR VEHICLE

CROSS-REFERENCES TO RELATED APPLICATIONS

This application claims the priority of German Patent Application, Serial No. 10 2015 005 754.5, filed May 5, 2015, pursuant to 35 U.S.C. 119(a)-(d), the disclosure of which is incorporated herein by reference in its entirety as if fully set forth herein.

BACKGROUND OF THE INVENTION

The present invention relates to a solenoid valve device for a motor vehicle.

The following discussion of related art is provided to assist the reader in understanding the advantages of the invention, and is not to be construed as an admission that this related art is prior art to this invention.

A solenoid valve device has a solenoid valve which can be fastened onto a motor vehicle body by a fastening device. For example, the solenoid valve is arranged in a motor compartment of the motor vehicle together with the fastening device. The solenoid valve can be designed as a vent solenoid valve by which an operating medium tank of the motor vehicle can be vented. For this purpose, the solenoid valve is, for example, connected to the operating medium tank and in fluid communication with an outside environment of the motor vehicle, for example via a filter device, in particular an activated carbon filter device. A fluid communication between the operating medium tank and the outside environment or the filter device can now be interrupted or established via the solenoid valve. Thus, a fluid communication is established in a first operating state of the solenoid valve, while it is interrupted in a second operating state. The solenoid valve device can thus be part of an operating medium tank device of the motor vehicle.

It would be desirable and advantageous to provide an improved solenoid valve device for a motor vehicle to obviate prior art shortcomings, while allowing quiet operation with little space demands at the same time.

SUMMARY OF THE INVENTION

According to one aspect of the present invention, a solenoid valve device for a motor vehicle includes a solenoid valve having an electromagnet, and a fastening device configured to mount the solenoid valve to a motor vehicle body of the motor vehicle, the fastening device having a carrier element for attachment of the solenoid valve, and holding arms extending from the carrier element for mounting the carrier element to the motor vehicle body, with the holding arms supporting the solenoid valve, at least in part, between them and being made elastic in a pulling direction of the electromagnet of the solenoid valve.

In general, the carrier element can have any configuration. For example, the carrier element may be shaped in the form of a carrier plate on which the solenoid valve can be arranged and secured.

According to another advantageous feature of the present invention, the solenoid valve can be arranged at a distance to the motor vehicle body, when the carrier element is mounted to the motor vehicle body. As a result, the solenoid valve is completely decoupled from the motor vehicle body. The holding arms have appropriate dimensions for this purpose. Thus, the solenoid valve is only indirectly connected to the motor vehicle body or fastened to it, specifically via the fastening device, in particular via the carrier element and the holding arms. Advantageously, the holding arms can also be spaced from the solenoid valve, i.e. the holding arms are prevented from touching the solenoid valve. The holding arms are, therefore, also only indirectly connected to the solenoid valve, specifically via the carrier element. In other words, the solenoid valve is only connected to the holding arms via the carrier element, while a connection between the solenoid valve and the motor vehicle body is established only via the carrier element and the holding arms.

The holding arms are configured to hold the solenoid valve, at least in part, between them. Thus, two holding arms are provided on opposite sides of the solenoid valve. Such a configuration of the fastening device results in a secure support of the solenoid valve with respect to the motor vehicle body, while at the same time realizing the aforementioned complete decoupling of the solenoid valve from the motor vehicle body.

The solenoid valve has the electromagnet and a valve device which is operatively connected to the electromagnet. The valve device may, for example, assume the aforementioned operating conditions, in particular the first operating state and the second operating state. The valve device is controllable by the electromagnet. The electromagnet can have an armature which can be displaced in or in opposition to the pulling direction. The pulling direction corresponds to, for example, a longitudinal center axis of the armature or is parallel thereto. The armature can be operatively connected to the valve device. When the electromagnet is actuated, pulses or vibrations are encountered that can cause unwanted noise to the extent that they are not sufficiently damped or inhibited. This is particularly the case, when the solenoid valve is designed as a directly-controlled solenoid valve, i.e. is not pilot-controlled. The solenoid valve is advantageously designed as such a directly-controlled valve, although, of course, the solenoid valve may, as an alternative, be configured as a pilot-controlled valve or forced-controlled valve.

In order to sufficiently dampen pulses or vibrations, caused during operation of the solenoid valve, and to inhibit body sound transmission to the motor vehicle body, the holding arms are made elastic in the pulling direction of the electromagnet. This means, for example, that the holding arms have smaller dimensions in the pulling direction than in a second direction that is perpendicular to the pulling direction and in a third direction that is perpendicular to both the pulling direction and the second direction.

In order to enable a cost-effective production of the fastening device, the holding arms can be designed in one piece and/or of uniform material with the carrier element. For example, the holding arms can be manufactured together with the carrier element during an injection molding process or are injection-molded onto the carrier element. The latter approach can, for example, use a two-component injection molding process in which the carrier element is manufactured of a material that is more rigid than a material of the holding arms. For cost reasons, it is currently preferred to make the carrier element and the holding arms of uniform material, with the elasticity of the holding arms, necessary for providing the damping, being realized by a sufficiently low strength of the holding arms.

According to another advantageous feature of the present invention, the holding arms can each have a clamping flange having a planar contact surface for contacting an opposing surface of the motor vehicle body. Advantageously, the clamping flange can be angled relative to the respective holding arm. For example, the clamping flange or its planar contact surface can extend perpendicular to the respective holding arm. When installing the solenoid valve device, the contact surface abuts an opposing surface of the motor vehicle body and is fastened there. For this purpose, provision can be made for a fastening recess which passes through the contact surface and through which a screw can be introduced into the motor vehicle body. Consequently, a head of the screw abuts on the side of the clamping flange facing away from the motor vehicle body and pushes the clamping flange in the direction of the motor vehicle body or upon the motor vehicle body. The fastening recess may, for example, be circular or oblong in cross section. The clamping flange may be configured in one piece and/or of uniform material with the respective holding arm.

According to another advantageous feature of the present invention, a damping element can be provided on the clamping flange for contact upon the opposing surface. The damping effect of the fastening device can be further improved in view of the presence of the damping element. The damping element can be made of a softer material than the holding arms or the clamping flange. Thus, the contact surface of the clamping flange is provided by the damping element. The damping element is thus part of the respective clamping flange. The damping element can be formed, for example, separately from the clamping flange and attached to the clamping flange only when the solenoid valve device is installed. Alternatively, of course, the damping element can be formed in one piece with the clamping flange, for example, injection-molded onto the clamping flange. For this purpose, the afore-mentioned two-component injection molding process may be used.

According to another advantageous feature of the present invention, the holding arms can be sized to extend in a direction that is angled in relation to the pulling direction. Thus, the holding arms have their largest dimensions in this direction so that a longitudinal center axis of each holding arm is angled in relation to the pulling direction, i.e. define an angle which is greater than 0° and less than 180°. The angle may, for example, be 45° to 135°, 60° to 120°, 70° to 110°, 75° to 105°, 80° to 100°, 85° to 95°, or exactly 90°. The holding arms thus have, as already explained above, dimensions in the pulling direction which are smaller than the dimensions in the direction of the longitudinal central axis of the respective holding arm.

In addition, or as an alternative, provision may be made for the planar contact surface to run parallel to the pulling direction or to define with the pulling direction an angle of greater than 0° or at most 5°, at most 10°, at most 15°, at most 20°, at most 25°, at most 30°, at most 35°, at most 40°, or at most 45°. Currently preferred is the parallel arrangement of the contact surface to the pulling direction, because the greatest damping effect can be achieved. As an alternative, the contact surface may be angled in relation to the pulling direction, i.e. to define with the pulling direction an angle of greater than 0° and less than 180°. Currently preferred is, however, when the angle corresponds to at most one of the afore-mentioned values.

According to another advantageous feature of the present invention, a cover can be fastened to the carrier element, with the solenoid valve having at least one area held between the carrier element and the cover. Advantageously, the at least one area of the solenoid valve is clamped between the carrier element and the cover. The solenoid valve arranged on or fastened to the carrier element is thus overlapped on its side facing away from the carrier element, at least in part, by the cover. When the solenoid device is mounted onto the motor vehicle body, the cover extends, at least in part, between the solenoid valve and the motor vehicle body. Provision may be made for the solenoid valve to directly abut the carrier element, but at a distance from the cover. Currently preferred is, however, when the solenoid valve abuts both the carrier element and the cover so that the solenoid valve is held clamped between the carrier element and the cover.

According to another advantageous feature of the present invention, the cover can have a recess for receiving the electromagnet. The electromagnet heats up during operation, requiring appropriate cooling to ensure reliable and long-lasting operation. For this reason, the cover is configured such that it does not cover or only partially cover the electromagnet. For this purpose, the cover has the recess through which the solenoid valve device, in particular the electromagnet, protrudes. Thus, while, for example, the valve device of the solenoid valve is arranged beneath the cover, in particular completely below the cover, the electromagnet is covered by the cover only partially or not at all, so that sufficient cooling is ensured.

According to another advantageous feature of the present invention, the cover can snap-fit in at least one latching recess of the carrier element. For example, the cover can have a latching projection which engages in the latching recess. The latching projection interacts with a boundary of the latching recess, with the boundary being used as the latching counter element. The cover can thus be fitted to the carrier element during installation of the solenoid valve device and snap-fitted thereto. This allows for a simple and extremely quick installation.

According to another advantageous feature of the present invention, the carrier element can include a plurality of latching recesses having longitudinal center axes offset from each other. The longitudinal central axis of each latching recess is oriented in a direction of their largest dimensions, which may be referred to as a longitudinal direction. In order to reliably prevent tilting of the cover with respect to the carrier element, several latching recesses can be formed in the carrier element, whose longitudinal central axes are moreover offset relative to each other. Advantageously, the longitudinal central axes are arranged in parallel spaced-apart relationship. Of course, provision may also be made for at least two of the central longitudinal axes to extend at an angle to one another, thus forming an angle with each other of greater than 0° and less than 180°.

According to another advantageous feature of the present invention, the solenoid valve can be embedded, at least in part, in a foam material element. The foam material element surrounds the solenoid valve, at least in part, suitably completely. In the latter case, for example, the electromagnet protrudes from the foam material element and therefore is not received in the foam material element. The foam material element improves the damping action. Advantageously, the foam material element is placed between the solenoid valve and the carrier element. In addition, or as an alternative, the foam material element can be placed between the solenoid valve and the cover. Advantageously, the solenoid valve is embedded in the foam material element such that the solenoid valve is only connected to the carrier element and the cover via the foam material element. For example, the foam material element is compressed, when the cover is attached to the carrier element, thus pushed by the cover in a direction of the carrier element or vice versa. Thus, the solenoid valve is fastened by the foam material element with respect to the carrier element and the cover and thereby largely decoupled from them.

According to another advantageous feature of the present invention, the foam material element can abut the carrier element and the cover. This configuration has been described above. The solenoid valve together with the foam material element is hereby clamped between the carrier element and the cover.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
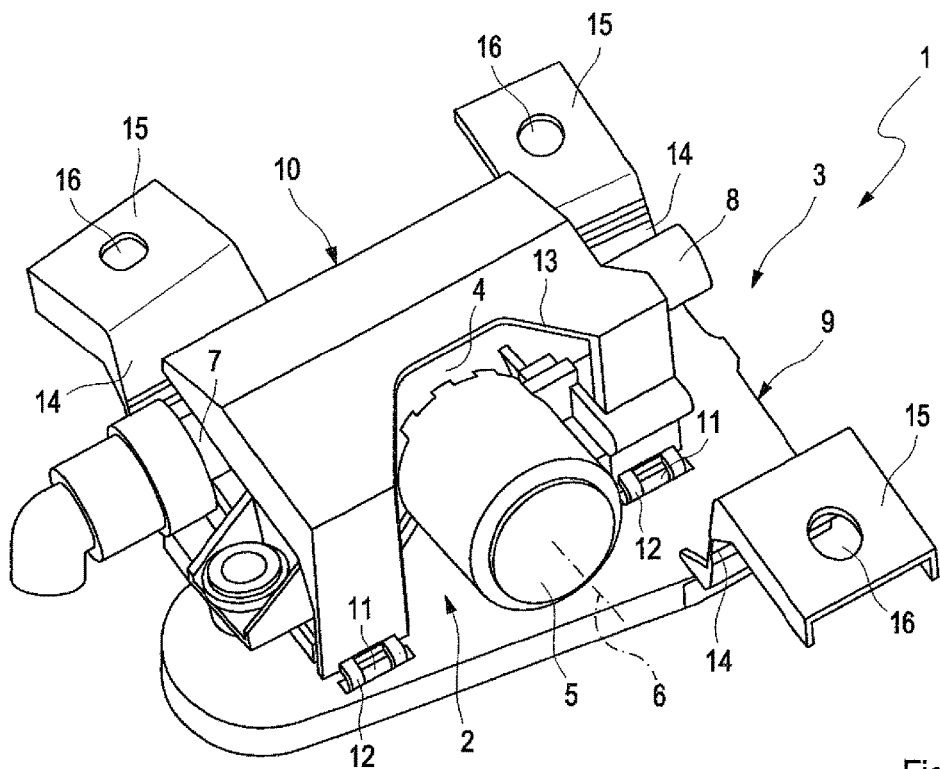
FIG. 1 is a perspective illustration of a solenoid valve device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of a solenoid valve device according to the present invention, generally designated by reference numeral 1. The solenoid valve device 1 includes a solenoid valve 2 and a fastening device 3. The solenoid valve 2 has a valve device 4 and an electromagnet 5 which is operatively connected to the valve device 4 so that the valve device 4 can be brought into different states or switching states by the electromagnet 5. For this purpose, the electromagnet 5 has, advantageously a movable armature, not shown here. The armature can be displaced in a pulling direction, indicated here by a longitudinal central axis 6 of the electromagnet 5, as well as in the opposite direction.

The valve device 4 has a first fluid connection 7 and a second fluid connection 8. For example, an operating medium tank of a motor vehicle is connected to the first fluid connection 7, while the second fluid connection 8 is in flow communication with an outside environment of the motor vehicle, suitably via a filter device, e.g. an activated carbon filter device. In a first switching state of the valve device 4, the flow connection between the operating medium tank and the outside environment is now interrupted, while the flow connection between the operating medium tank and the outer outside environment is established in a second switching state of the valve device 4.

The solenoid valve 2 is arranged, for example, in a motor compartment of the motor vehicle and is fastened to a motor vehicle body of the motor vehicle by the fastening device 3, which includes a carrier element 9, e.g. in the form of a carrier plate that has a substantially planar surface. Furthermore, the fastening device 3 has a cover 10 which is connected to the carrier element 9. For example, the carrier element 9 has hereby latching recesses 11 for engagement of latching projections 12 of the cover 10.

The cover 10 is formed such that the solenoid valve 2 is arranged, at least in part, between the carrier element 9 and the cover 10, i.e. the solenoid valve 2 arranged on the carrier element 9 is, at least in part, overlapped by the cover 10. In order to ensure sufficient cooling of the electromagnet 5, the cover 10 has a recess 13. At least part of the electromagnet 5 protrudes beyond the recess 13. Provision can now be made for the solenoid valve 2, in particular the valve device 4, to be clamped between the carrier element 9 and the cover 10.

Advantageously, the solenoid valve 2 is, at least in part, embedded in a foam material element (not shown here). In this case, the solenoid valve 2 is connected to the carrier element 9 and the cover 10 suitably only via the foam material element.

Further provided are holding arms 14 which extend from the carrier element 9 and fasten the carrier element 9 to the motor vehicle body. The holding arms 14 are arranged so that they support the solenoid valve 2, at least in part between them. The holding arms 14 extend from the carrier element 9 in a same direction as the solenoid valve 2. A clamping flange 15 is provided on each holding arm 14 and advantageously has a fastening recess 16. The fastening recess 16 is intended, for example, for receiving a screw, by which the respective clamping flange 15 is mounted to the motor vehicle body. The configuration of such a fastening device 3 enables a substantial damping of pulses or vibrations emanating from the solenoid valve 2. As a result, little or no body sound from the solenoid valve 2 is transmitted to the motor vehicle body. The holding arms 14 are made elastic at least in the pulling direction of the electromagnet 5 for this purpose.

Figure 2:
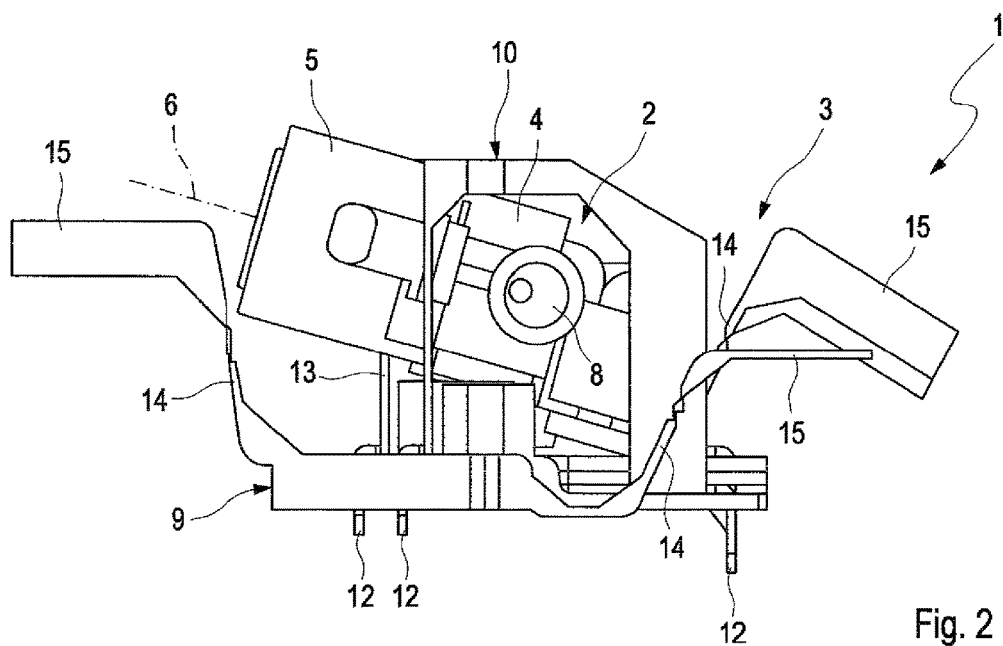
FIG. 2 is a side view of the solenoid valve device.

FIG. 2 shows a side view of the solenoid valve device 1. As is readily apparent, the holding arms 14 can have different longitudinal extensions. In addition, the clamping flanges 15 may extend at different angles to the carrier element 9 or the respective holding arm 14. It is also readily apparent that at least one of the holding arms 14, advantageously all the holding arms 14, extending from the carrier element 9, have smaller dimensions than the solenoid valve 2. This means that the solenoid valve 2 protrudes in the direction facing away from the carrier element 9 beyond the holding arms 14 or the corresponding clamping flanges 15.

The fastening device 3 is used, for example, to secure the solenoid valve 2 to a motor vehicle body, which has a receiving opening for the solenoid valve 2. In such a configuration, both the solenoid valve 2 and the cover 10 extend at least partially into the receiving opening. Of course, as an alternative, it is also conceivable to dimension the holding arms 14 greater in the direction facing away from the carrier element 9 than the solenoid valve 2, so that the holding arms 14 project beyond the solenoid valve 2.

Figure 3:
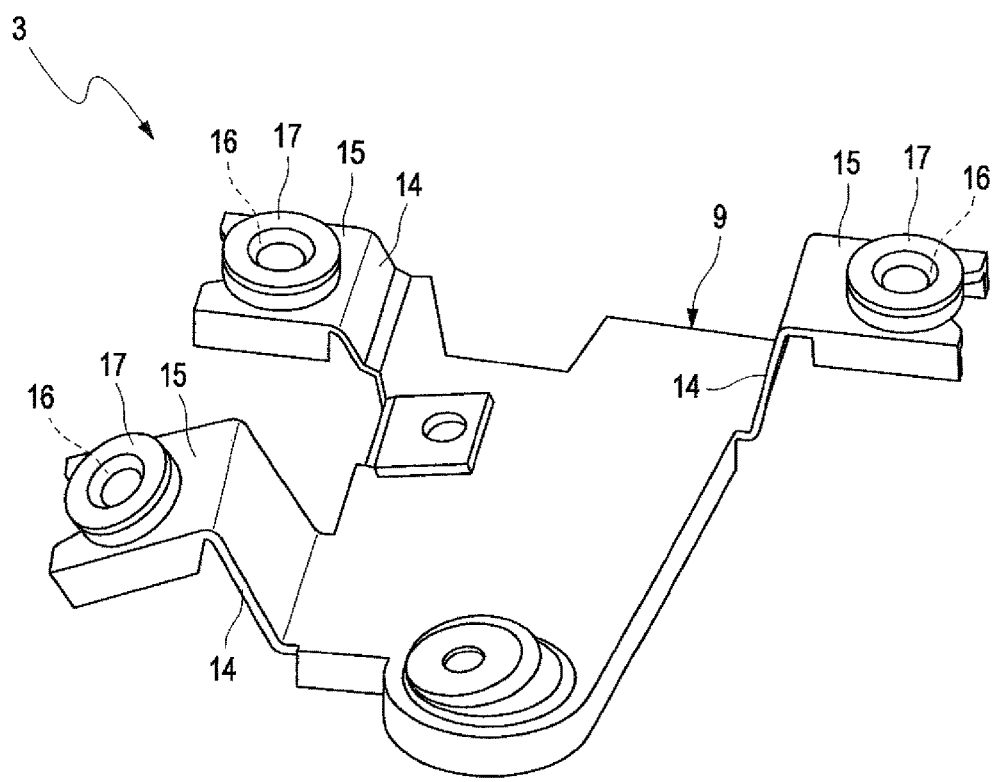
FIG. 3 is a detailed representation of a carrier element of a fastening device of the solenoid valve device.

FIG. 3 shows a detailed illustration of the fastening device 3, depicting in particular the carrier element 9 with the holding arms 14 and the clamping flanges 15. In the embodiment shown here, each of the clamping flanges 15 has a damping element 17, via which it can abut against the motor vehicle body. The damping element 17 is inserted, for example, in the corresponding fastening recess 16. The damping element 17 is made advantageously of a softer material than the holding arms 14 and the clamping flanges 15. The damping action of the fastening device 3 is further enhanced by using the damping elements 17.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A solenoid valve device for a motor vehicle, comprising:
    a solenoid valve having an electromagnet which defines a longitudinal central axis; and
    a fastening device configured to mount the solenoid valve to a motor vehicle body of the motor vehicle, said fastening device having a carrier element in the form of a carrier plate for attachment of the solenoid valve, and three holding arms connected to opposite sides of the carrier element and extending in a same direction as the solenoid valve toward the motor vehicle body from the carrier element at different angles with respect to the carrier element for mounting the carrier element to the motor vehicle body, said holding arms supporting the solenoid valve, at least in part, between them, said holding arms and carrier element made in one piece and of a same material, said holding arms being made elastic in a direction of the longitudinal axis of the electromagnet, wherein the holding arms each have a clamping flange at an end opposite the carrier element, each of said clamping flange having a planar contact surface for contacting an opposing surface of the motor vehicle body,
    wherein at least two of the clamping flanges lie in different planes that are not parallel to one another.

2. The solenoid valve device of claim 1, wherein the solenoid valve is arranged at a distance to the motor vehicle body, when the carrier element is mounted to the motor vehicle body.

3. The solenoid valve device of claim 1, wherein the holding arms are arranged at a distance to the solenoid valve.

4. The solenoid valve device of claim 1, further comprising a cover fastened to the carrier element, said solenoid valve having at least one area held between the carrier element and the cover.

5. The solenoid valve device of claim 4, wherein the at least one area of the solenoid valve is clamped between the carrier element and the cover.

6. The solenoid valve device of claim 4, herein the cover has a recess for receiving the electromagnet.

7. The solenoid valve device of claim 4, wherein the cover snap-fits in at least one latching recess of the carrier element.

8. The solenoid valve device of claim 1, wherein the carrier element includes a plurality of latching recesses having longitudinal center axes offset from each other.

9. The solenoid valve device of claim 1, wherein the solenoid valve is embedded, at least in part, in a foam material element.

10. The solenoid valve device of claim 9, further comprising a cover fastened to the carrier element, said solenoid valve having at least one area held between the carrier element and the cover, wherein the foam material element abuts the carrier element and the cover.

11. The solenoid valve device of claim 1, further comprising a damping element injection-molded onto each of the damping flanges in a two-component injection molding process for contact upon the opposing surface.

12. The solenoid valve device of claim 11, wherein the damping elements is made of a material which is softer than a material of the holding arms or the clamping flanges.

13. The solenoid valve device of claim 1, wherein the fastening device has three of said holding arms only.

14. The solenoid valve device of claim 1, wherein at least two of the clamping flanges extend at different angles in relation to the carrier element.

15. The solenoid valve device of claim 1, wherein the holding arms and the carrier element are configured as a one-piece injection-molded part.

* * * * *

UNITED STATES PATENT AND TRADEMARK OFFICE
CERTIFICATE OF CORRECTION

PATENT NO. : 10,451,191 B2  
APPLICATION NO. : 15/146365  
DATED : October 22, 2019  
INVENTOR(S) : Harald Hagen Page 1 of 1

It is certified that error appears in the above-identified patent and that said Letters Patent is hereby corrected as shown below:

On the Title Page

Under [74] Attorney, Agent, or Firm:  
Replace "Henry G. Feiereisen" with --Henry M. Feiereisen--

In the Claims

In Column 8, Claim 6, Line 14:  
Replace "herein" with --wherein--

In Column 8, Claim 11, Line 31:  
Replace "damping" with --clamping--

Signed and Sealed this  
Seventh Day of January, 2020

Andrei Iancu  
*Director of the United States Patent and Trademark Office*